United States Patent
Gervelmeyer et al.

(10) Patent No.: US 6,798,138 B2
(45) Date of Patent: Sep. 28, 2004

(54) HALOGEN INCANDESCENT LAMP FOR MOTOR VEHICLES

(75) Inventors: Rolf Gervelmeyer, Geilenkirchen (DE); Heinz Schloemer, Selfkant (DE); Ralf Schaefer, Aachen (DE); Leo Wings, Eschweiler (DE); Franz-Josef Brueckmann, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 177 days.

(21) Appl. No.: 09/860,310

(22) Filed: May 18, 2001

(65) Prior Publication Data

US 2002/0021065 A1 Feb. 21, 2002

(30) Foreign Application Priority Data

Aug. 18, 2000 (DE) .......................................... 100 40 887

(51) Int. Cl.[7] ............................. H01K 1/26; H01K 1/28; H01J 61/40

(52) U.S. Cl. ....................... 313/580; 313/110; 313/112; 313/489; 313/635

(58) Field of Search ................................ 313/110, 112, 313/489, 635, 580

(56) References Cited

U.S. PATENT DOCUMENTS

| 4,342,937 A | * | 8/1982 | Nagel ........................ 313/113 |
| 4,393,331 A | * | 7/1983 | Dobrusskin et al. ........ 313/112 |
| 5,111,105 A | | 5/1992 | Yamamoto .................. 313/112 |
| 5,578,893 A | | 11/1996 | Yamamoto .................. 313/112 |
| 6,369,510 B1 | * | 4/2002 | Shaw et al. .................. 313/635 |
| 6,570,302 B1 | * | 5/2003 | Boonekamp et al. ....... 313/112 |

FOREIGN PATENT DOCUMENTS

| DE | 8600640 | 7/1986 | ............ H01K/1/32 |
| DE | 8600640.1 | 7/1986 | |
| EP | 1003203 A1 | 5/2000 | |

* cited by examiner

*Primary Examiner*—Nimeshkumar D. Patel
*Assistant Examiner*—Mariceli Santiago
(74) *Attorney, Agent, or Firm*—Ernestine C. Bartlett

(57) ABSTRACT

The invention relates to a halogen incandescent lamp for motor vehicles with an elongate bulb which is closed at one end and has a vacuumtight pinch seal at the other end, with at least one incandescent element arranged in the bulb, with a lamp cap connected to the pinch seal, and with current supply leads which are passed through the pinch seal to the incandescent element, with an annular optical filter which is provided at the closed end of the bulb. It is possible with such a halogen incandescent lamp in a simple manner both to change the subjective impression of the generated light and to improve the objective properties through emphasizing of a desired region of the spectrum.

9 Claims, 1 Drawing Sheet

HALOGEN INCANDESCENT LAMP FOR MOTOR VEHICLES

TECHNICAL FIELD

Figure 1:
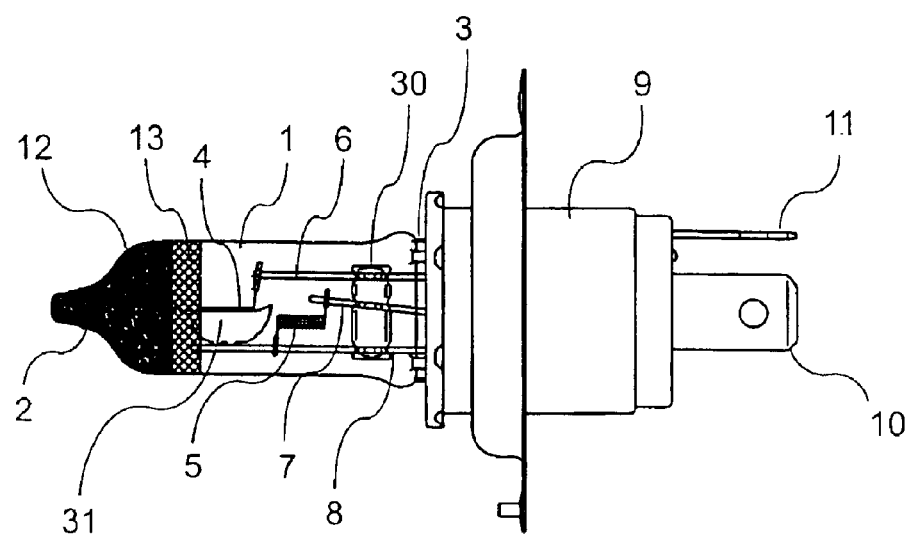

The invention relates to a halogen incandescent lamp for motor vehicles with an elongate bulb which is closed at one end and has a vacuumtight pinch seal at the other end, with at least one incandescent element arranged in the bulb, with a lamp cap connected to the pinch seal, and with current supply leads which are passed through the pinch seal to the incandescent element.

BACKGROUND AND SUMMARY

Such halogen incandescent lamps for motor vehicles are, for example, the familiar H4 or H7 car lamps. The bulb is usually made of quartz or hard glass and has a substantially cylindrical shape. The diameter of the bulb, however, need not necessarily be constant along its length. The tubular bulb is closed at one end in a fusion process. Depending on the type, one (H7) or two (H4) incandescent elements, usually made of coiled tungsten wire, is or are arranged in the bulb. The incandescent elements are usually connected to the current supply leads by means of welding, said leads being formed, for example, from molybdenum wires and being introduced through the still open end of the bulb. The bulb is evacuated, provided with a suitable filling, and closed vacuumtight by means of a pinch seal. In this pinch seal, the current supply leads are fixed, so that the incandescent elements occupy a defined position in the bulb. The position may be adjusted during the pinching process. The lamp cap, usually made of several metal parts (or alternatively synthetic resin parts), which are welded/fused together, is fixedly connected to the pinch seal of the bulb. At least one part is constructed here such that it can serve as a reference for the position of the incandescent elements in the bulb. When incorporated in a headlamp assembly of a motor vehicle, this reference surface is used for placing the incandescent element(s) of the lamp in a defined position in the reflector of the headlamp assembly. As a result of this, a reflector of mating design is capable of generating a suitable light beam from the incandescent element.

A halogen motorcar incandescent lamp is known from German utility model G 86 00 640 U1. The lamp described therein comprises a glass bulb in which an incandescent body is arranged in a gas comprising halogen, which lamp bulb has a seal at a first end through which the current supply conductors extend to the incandescent body. The glass bulb is provided with a light-absorbing layer on its outer surface at the other end. A yellow interference filter of alternate layers of comparatively high and comparatively low refractive index is provided on the outer surface of the glass bulb. The lamp bulb further comprises a light-absorbing layer at the first end of the bulb. Undesirable reflections on separate yellow outer bulbs are prevented by means of the yellow interference filter on the glass bulb. The application of the yellow interference filter on the glass bulb of the lamp means that yellow glass need not be used for the outer bulb. The yellow interference filter is provided on the entire glass bulb, so that the lamp generates yellow light, in particular for reducing reflections in front of a motor vehicle head light, for example in the case of fog. The light-absorbing layer at the first, pinch-sealed end of the lamp bulb also shown as part of the halogen motorcar incandescent lamp counteracts the radiation of blue light. The radiation in a nonessential location of a portion of the light generated by the incandescent body is prevented by means of an absorption filter. The two layers acting as an optical filter cause the halogen incandescent lamp to generate a yellow light beam. Known lamps have the disadvantage that the coating of the entire bulb leads to the subjective impression that the generated light is darker than in the case of colorless glass bulbs.

It is an object of the invention to provide a halogen incandescent lamp for motor vehicles which offers improved illumination properties when used as a light source in a motor vehicle headlamp.

This object is achieved by means of a halogen incandescent lamp for motor vehicles with the characteristics as defined in the first claim. Although it is favorable to use quartz or hard glass, it is obvious that any transparent material may be used for the bulb without departing from the scope of protection of the claim. The annular shape of the optical filter results from the shape on the substantially cylindrical bulb. Nevertheless, the annular optical filter may also extend over the closed end of the bulb, so that a cap with a ring is created on the bulb. The width of the ring on the bulb may be determined through taking into account the application and other components such as, for example, the reflector used. Just as the width of the annular optical filter may vary in dependence on the requirements, the amount of the total light output reduced by the optical filter may also be adapted (for example to legal requirements). This may be achieved through the choice of a suitable material or the application of several layers. Known processes (dipping, spraying, vapor deposition) may be used for providing such an optical filter.

This renders it possible in a simple manner both to change the subjective impression of the generated light and to improve the objective properties through emphasizing a desired region of the spectrum. Since a major portion of the bulb remains clear, a high proportion of white light is obtained in principle. A particularly interesting advantage of the lamp according to the invention is the possibility of increasing the total light output through optimization of the incandescent elements and the filling in the bulb and to adapt it to legal requirements by means of the annular filter. It is possible for this purpose, for example, to effect a color shift to short-wave portions through an increase in the reflectivity. Furthermore, the light issuing from the clear region of the bulb is particularly suitable for use in forming a light beam in a reflector. Since more light can be projected onto the road by means of the reflector, the lamps according to the invention are eminently suitable as light sources in motor vehicle headlights.

In a preferred embodiment of the invention, an absorption filter is provided for forming the annular optical filter, which is advantageously formed by a coating of at least one layer of a colored metal oxide. Absorption filters are particularly suitable because they generate no reflected light which may issue from the bulb in an uncontrolled manner. Furthermore, the metal oxides may be provided on the lamp in a simple manner in dissolved form by known methods. Various materials (for example, cobalt aluminate $CoAl_2O_4$, neodymium) are known, so that a suitably adapted absorption filter may be chosen. In particular, a wavelength-dependent absorption may be adjusted. In a further development of the invention, therefore, it is provided that the absorption filter absorbs mainly light with wavelengths above 500 nm. Since the non-coated portion of the bulb is clear, light with a high blue component is achieved in this manner. This has the advantage in particular that persons and objects (for example traffic signs, direction posts, informative placards) irradiated on the road reflect better. Safety is clearly enhanced through a greater emphasis on the higher-frequency region of the spectrum. Nevertheless, however, the emphasis on a different region of the spectrum may also be useful for certain applications. A suitable absorption filter may be provided for all cases through the use of a corresponding material within the scope of the invention on which the lamp is based.

In a further embodiment of the lamp according to the invention, a reflection filter is provided for forming the annular optical filter. Such a reflection filter is preferably an interference filter with alternate layers of high and low refractive index.

In a further embodiment of the invention, the bulb has a light-absorbing layer at its closed end, and the annular optical filter extends over and beyond the light-absorbing layer onto the bulb. Various motor vehicle lamps (for example H4) have a cap which is impermeable to light at the closed end facing away from the reflector in the headlamp. The annular optical filter according to the invention may be provided also in the case of such lamps. The optical filter may be provided on the layer impermeable to light or between the bulb and the layer impermeable to light.

In an advantageous embodiment of the invention, the annular optical filter is provided from the closed end of the bulb up to that level on the bulb where a first incandescent element is positioned. The width of the annular filter thus extends from the end of the bulb up to the level on the bulb where approximately the incandescent element or, in the case of several incandescent elements, the first element arranged in longitudinal direction in the bulb starts. The filter may end abruptly at the level of the incandescent coil or, for example, may become gradually fainter. If an optional light-absorbing layer was additionally provided on the closed end of the bulb, the annular optical filter will extend from the end of this cap up to the position of the first incandescent element.

Embodiments of the invention will be explained in more detail below with reference to drawings, in which

BRIEF DESCRIPTION OF THE DRAWING FIGURES

Figure 2:
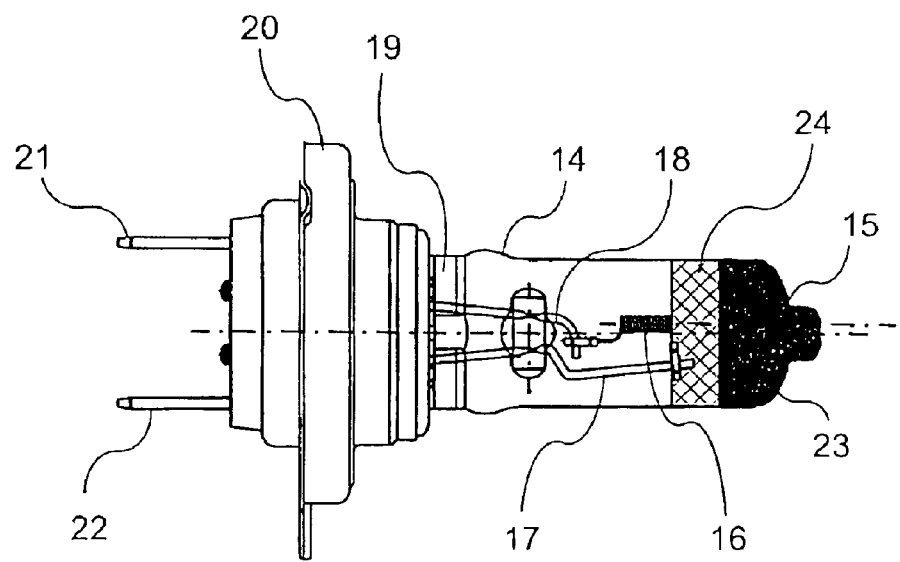

FIG. 1 shows a halogen incandescent lamp according to the invention with two incandescent elements and a light-absorbing layer on a closed end of the bulb, and FIG. 2 shows a halogen incandescent lamp with an incandescent element.

DETAILED DESCRIPTION

The lamp shown in FIG. 1 is a H4 type motorcar lamp which has a bulb 1 of quartz glass and an essentially cylindrical shape. The bulb 1 has a closed end 2 on which a light-absorbing layer 12 is provided. Two incandescent elements 4 and 5, constructed as coiled tungsten wires, are arranged in the bulb 1, the latter containing a filling with halogen. A passing beam coil 4 is used for generating a passing (low) beam, and a main beam coil 5 is used for generating a main light beam in a motor vehicle headlight. The passing beam coil 4 is connected to current supply leads 6 and 8, and the main beam coil 5 to current supply leads 7 and 8. The current supply leads 6, 7, and 8 are fixed in a pinch seal 3 which closes the bulb 1 at the other end in a vacuumtight manner. A fixation element 30 is additionally provided in the bulb 1, stabilizing the respective relative positions of the current supply leads 6, 7, and 8. The passing beam coil 4 and the main beam coil 5 thus occupy defined positions inside the bulb 1 in conjunction with the pinch seal 3, which positions can be adjusted during the pinching process. Furthermore, a screen cup 31 is provided in the bulb 1 for the passing beam coil 4 so as to prevent a radiation of the passing beam in this direction.

The pinch seal 3 is fixedly connected to a lamp cap 9. The lamp 9 has a reference surface which defines the positions of the coils 4 and 5 in a reflector of a headlight when being incorporated in this reflector. At the other side, the lamp cap 9 is provided with external contacts 10 and 11. An annular optical filter 13 is provided at the closed end 2 of the bulb 1. The filter 13 is provided on the closed end 2 in a dipping process and extends annularly on the bulb 1 up to approximately that level where the passing beam coil 4 starts. The light-absorbing layer 11 present on H4 motorcar lamps is provided over the filter 13. Depending on the manufacturing process, however, it may be more favorable first to provide the light-absorbing layer 12 and then the filter 13. The filter 13 consists of a cobalt aluminate coating ($CoAl_2O_4$), which absorbs mainly light with wavelengths above approximately 500 nm. As a result, blue light issues from the bulb 1 in the region of the filter 13. The filter 13 covers the bulb 1 to a small extent only in that region where the light generated by the passing beam coil 4 hits the bulb 1 directly. As a result, the portion of the generated light issuing in a controlled manner can be used as before for forming a passing beam in the headlight, so that the light beam has a high white component. The coils 4 and 5 generate more light here than in known H4 motorcar lamps thanks to an optimization of the coils 4 and 5 and to the filling of the bulb 1. The legal upper limit for the total quantity of light emitted is set by means of the filter 13. The light issuing in the region of the filter 13 adds a blue component to the light beam, so that the total light beam emerging from the lamp or the head light has better reflection properties. In total, therefore, more light can be projected onto the road with a headlight comprising this halogen incandescent lamp as its light source.

In the embodiment of the halogen incandescent lamp shown in FIG. 2, the lamp is a H7 type motorcar lamp with one incandescent element. It comprises a bulb 14 with a closed end 15, in which an incandescent coil 16 is arranged, connected to current supply leads 17 and 18, similar to the lamp described with reference to FIG. 1. The current supply leads are fixed in a pinch seal 19 which closes off the bulb 14, so that the incandescent coil 16 occupies a defined position inside the bulb 14. The pinch seal 19 is again fixedly connected to a lamp cap 20 which at its other side carries external contacts 21 and 22 for connection to a power source. The position of the incandescent coil 16 in the reflector is defined during incorporation in a motor vehicle head light by means of a reference surface of the lamp cap 20. In this embodiment, again, a light-absorbing layer 23 is provided on the bulb. An annular filter 24 extends from the closed end 15 up to approximately the level of the bulb 14 where the incandescent coil 16 starts. The filter 24 is again constructed as a wavelength-dependent absorption filter which may be provided on the light-absorbing layer 23 or directly on the bulb 14. The annular region in which the filter 24 acts on the light issuing from the bulb 14 has a width of approximately 3–4 mm. A coating of cobalt aluminate is used again, so that this lamp with only one incandescent coil 16 also has the properties described above.

What is claimed is:

1. A halogen incandescent lamp for motor vehicles with an elongate bulb which is closed at one end and which has a vacuumtight pinch seal at the other end, at least one incandescent element arranged in the bulb, a lamp cap connected to the pinch seal, current supply leads which extend through the pinch seal to the incandescent element, and an annular optical absorption filter which is provided at the closed end of the bulb, wherein the absorption filter is formed by a coating with at least one layer comprising cobalt aluminate ($CoAl_2O_4$).

2. A halogen incandescent lamp as claimed in claim 1, characterized in that the absorption filter absorbs mainly light with wavelengths above 500 nm.

3. A halogen incandescent lamp as claimed in claim 1, characterized in that the bulb has a light-absorbing layer at its closed end, and the annular optical filter extends over and beyond the light-absorbing layer onto the bulb.

4. A halogen incandescent lamp as claimed in claim 3, characterized in that the light-absorbing layer is provided on the bulb, and the annular optical filter is provided on said light-absorbing layer.

5. A halogen incandescent lamp for motor vehicles with an elongate bulb which is closed at one end and which has a vacuumtight pinch seal at the other end, at least one incandescent element arranged in the bulb, a lamp cap connected to the pinch seal, current supply leads which extend through the pinch seal to the incandescent element, and an annular optical filter which is provided at the closed end of the bulb, characterized in that the annular optical filter is provided from the closed end of the bulb up to that level on the bulb where a first incandescent element is positioned in the bulb.

6. A halogen incandescent lamp as claimed in claim 5, characterized in that the annular optical filter is provided from the closed end of the bulb up to that level on the bulb where approximately the first incandescent element starts.

7. A halogen incandescent lamp as claimed in claim 5, characterized in that the annular optical filter covers only a portion of the bulb and only in that region where the light is generated by the first incandescent element.

8. A halogen incandescent lamp as claimed in claim 5, characterized in that the annular optical filter ends abruptly at the level of the first incandescent element.

9. A halogen incandescent lamp as claimed in claim 5, characterized in that the annular optical filter ends gradually at the level of the first incandescent element.

* * * * *